(12) United States Patent
Purwar et al.

(10) Patent No.: US 10,561,958 B2
(45) Date of Patent: Feb. 18, 2020

(54) MODULAR FRAME CONNECTORS AND SYSTEM UTILIZING SAME

(71) Applicant: The Research Foundation for The State University of New York, Albany, NY (US)

(72) Inventors: Anurag Purwar, Dix Hills, NY (US); Qiaode Ge, Smithtown, NY (US); Apoorva Godse, Stony Brook, NY (US)

(73) Assignee: The Research Foundation for The State University of New York, Albany, NY (US)

( * ) Notice: Subject to any disclaimer, the term of this patent is extended or adjusted under 35 U.S.C. 154(b) by 0 days.

(21) Appl. No.: 15/774,124

(22) PCT Filed: Nov. 7, 2016

(86) PCT No.: PCT/US2016/060793
§ 371 (c)(1),
(2) Date: May 7, 2018

(87) PCT Pub. No.: WO2017/079727
PCT Pub. Date: May 11, 2017

(65) Prior Publication Data
US 2018/0326319 A1 Nov. 15, 2018

Related U.S. Application Data

(60) Provisional application No. 62/416,955, filed on Nov. 3, 2016, provisional application No. 62/416,946, filed (Continued)

(51) Int. Cl.
*A63H 33/10* (2006.01)
*A63H 33/12* (2006.01)
*F16B 5/06* (2006.01)

(52) U.S. Cl.
CPC .......... *A63H 33/101* (2013.01); *A63H 33/12* (2013.01); *F16B 5/0607* (2013.01)

(58) Field of Classification Search
CPC ....... A63H 33/062; A63H 33/101; F16B 5/00; F16B 5/06; F16B 5/0607; F16B 5/0614
(Continued)

(56) References Cited

U.S. PATENT DOCUMENTS 2,885,822 A * 5/1959 Onanian ............... A63H 33/101
446/121
3,570,169 A * 3/1971 Jacob ..................... A63H 33/06
446/114
(Continued)

FOREIGN PATENT DOCUMENTS

CN 1336844 2/2002
CN 103648600 1/2010
(Continued)

OTHER PUBLICATIONS

PCT/ISA/237 Written Opinion issued on PCT/US2016/060793, pp. 9.
(Continued)

*Primary Examiner* — Alexander R Niconovich
(74) *Attorney, Agent, or Firm* — The Farrell Law Firm, P.C.; John F. Gallagher, III

(57) ABSTRACT

Provided are a clip system and method for joining plates using the system of clips, with each clip including a base, a first protrusion, a second protrusion, a first pair of fingers, and a second pair of fingers, with the first protrusion and the second protrusion extending in opposite directions away from the base.

18 Claims, 10 Drawing Sheets

Related U.S. Application Data on Nov. 3, 2016, provisional application No. 62/412,973, filed on Oct. 26, 2016, provisional application No. 62/251,926, filed on Nov. 6, 2015.

(58) Field of Classification Search
USPC .......... 446/85, 108, 113, 114, 116, 120, 121
See application file for complete search history.

(56) References Cited

U.S. PATENT DOCUMENTS

| | | | | |
|---|---|---|---|---|
| 3,689,075 | A * | 9/1972 | Adelsoh | A63F 9/12 273/157 R |
| 3,698,124 | A * | 10/1972 | Reitzel | A63H 33/06 446/114 |
| 3,699,709 | A * | 10/1972 | Schmidt | A63H 33/067 446/113 |
| 3,891,335 | A * | 6/1975 | Feil | A47B 47/0025 403/173 |
| 4,789,370 | A * | 12/1988 | Ellefson | A63H 33/062 446/113 |
| 5,121,526 | A * | 6/1992 | Burkard | A63H 33/10 24/336 |
| 5,853,313 | A * | 12/1998 | Zheng | A63H 33/065 446/106 |
| 5,928,051 | A * | 7/1999 | Krog | A63H 33/10 446/104 |
| 6,149,487 | A * | 11/2000 | Peng | A63H 33/08 446/108 |
| 6,595,825 | B1 * | 7/2003 | De Wilde | A63H 33/067 403/348 |
| 6,669,526 | B2 * | 12/2003 | Manville | A63H 33/101 446/100 |
| 6,672,931 | B1 * | 1/2004 | Bagley | A63H 33/08 446/106 |
| 6,676,474 | B2 * | 1/2004 | Glickman | A63H 33/062 446/120 |
| 6,736,691 | B1 * | 5/2004 | Bach | A63H 33/101 446/128 |
| 6,899,588 | B1 * | 5/2005 | Clever | A63H 33/084 446/120 |
| 7,371,146 | B2 * | 5/2008 | Scarborough | A63H 33/062 446/108 |
| 7,510,457 | B2 * | 3/2009 | Hussa-Lietz | A63H 33/04 434/79 |
| 7,588,476 | B2 * | 9/2009 | Hammond | A63H 33/086 446/104 |
| 7,666,054 | B2 * | 2/2010 | Glickman | A63H 33/082 446/120 |
| 7,736,211 | B2 * | 6/2010 | Marzetta | A63H 33/106 446/113 |
| 9,004,974 | B2 * | 4/2015 | Brooks | A63H 33/10 446/114 |
| 9,044,690 | B2 * | 6/2015 | Uttley | A63H 33/102 |
| 9,382,932 | B2 * | 7/2016 | Nelson | F16B 7/0446 |
| 2002/0090881 | A1 * | 7/2002 | Turnham | A63H 33/10 446/85 |
| 2007/0277459 | A1 * | 12/2007 | Marzetta | A63H 33/101 52/281 |
| 2008/0214087 | A1 * | 9/2008 | Warner | A63H 33/102 446/124 |
| 2012/0000059 | A1 * | 1/2012 | Fox | F16B 2/20 29/525.01 |
| 2012/0028534 | A1 * | 2/2012 | Unger | F16B 2/22 446/111 |
| 2016/0258461 | A1 * | 9/2016 | Muller | A47D 1/0085 |
| 2018/0021689 | A1 * | 1/2018 | Cochella | A63H 33/101 446/124 |

FOREIGN PATENT DOCUMENTS

| | | |
|---|---|---|
| CN | 101627168 | 11/2015 |
| KR | 101414360 | 7/2014 |
| KR | 200478274 | 9/2015 |
| WO | WO 00/41792 | 7/2000 |

OTHER PUBLICATIONS

PCT/ISA/210 Search Report issued on PCT/US2016/060793, pp. 3.
Chinese Office Action dated Dec. 3, 2019 issued in counterpart Application No. 201680064453.8.

* cited by examiner

MODULAR FRAME CONNECTORS AND SYSTEM UTILIZING SAME

PRIORITY

This application claims priority to U.S. Provisional Applications Nos. 62/251,926, 62/412,973, 62/416,946 and 62/416,955, filed with the U.S. Patent and Trademark Office on Nov. 6, 2015, Oct. 26, 2016, Nov. 3, 2016 and Nov. 3, 2016, respectively, the contents of each of which are incorporated herein by reference.

BACKGROUND

1. Field of the Invention

The present invention generally relates to modular building components and systems, and a method of constructing systems utilizing same.

2. Description of the Background Art

Toy construction and modeling, particularly construction using blocks or connectable components, fosters imagination, stimulates learning, and advances problem solving. However, conventional systems do not allow for design using a wide variety of materials, e.g., Acrylic®, Delrin® and wood, that can be fabricated into boards and/or beams having various thicknesses, based on the physical, e.g., load-bearing, demands of each unique toy. Moreover, conventional systems do not provide a single set of clips that releasably attach to unique geometrical features, e.g., slots and holes, of the boards and beams.

Building robotic systems also fosters imagination and stimulates learning. However, conventional robotic building systems, e.g., Lego® Mindstorms, suffer from similar shortcomings, and merely provide fasteners that function with single thickness boards and beams, and limit interconnection of boards to a single geometrical plane. Further still, conventional systems are not adaptable to varied dimensions of robotic components, and typically require using only components with corresponding dimensions.

SUMMARY

To avoid the above shortcomings of conventional systems and methods, aspects of the present disclosure provide a system of clips for joining beams, plates and other materials, with each clip including a base, a first protrusion, a second protrusion, a first pair of fingers, and a second pair of fingers, with the first protrusion and the second protrusion extending in opposite directions away from the base.

Another aspect provides a clip comprising a base, a first protrusion, a second protrusion, a first pair of fingers, and a second pair of fingers, with the first pair of fingers comprising a first opening at a distal end thereof, extending to the base to form a first gutter, and with the second pair of fingers comprising a second opening at a distal end thereof, extending to the base to form a second gutter.

A further aspect provides a system utilizing the clips to releasably attach at least two plate by compressing finger of the first pair of fingers toward each other to fit into a securing hole of a plate or a beam.

BRIEF DESCRIPTION OF THE DRAWINGS

The above and other objects, features and advantages of certain exemplary embodiments of the present disclosure will be more apparent from the following detailed description taken in conjunction with the accompanying drawings, in which.

DETAILED DESCRIPTION

The following detailed description of preferred embodiments of the disclosure is made in reference to the accompanying drawings. In describing the disclosure, an explanation about related functions or constructions known in the art are omitted for the sake of clearness in understanding the concept of the disclosure, and to avoid obscuring the disclosure with unnecessary detail.

Figure 1:
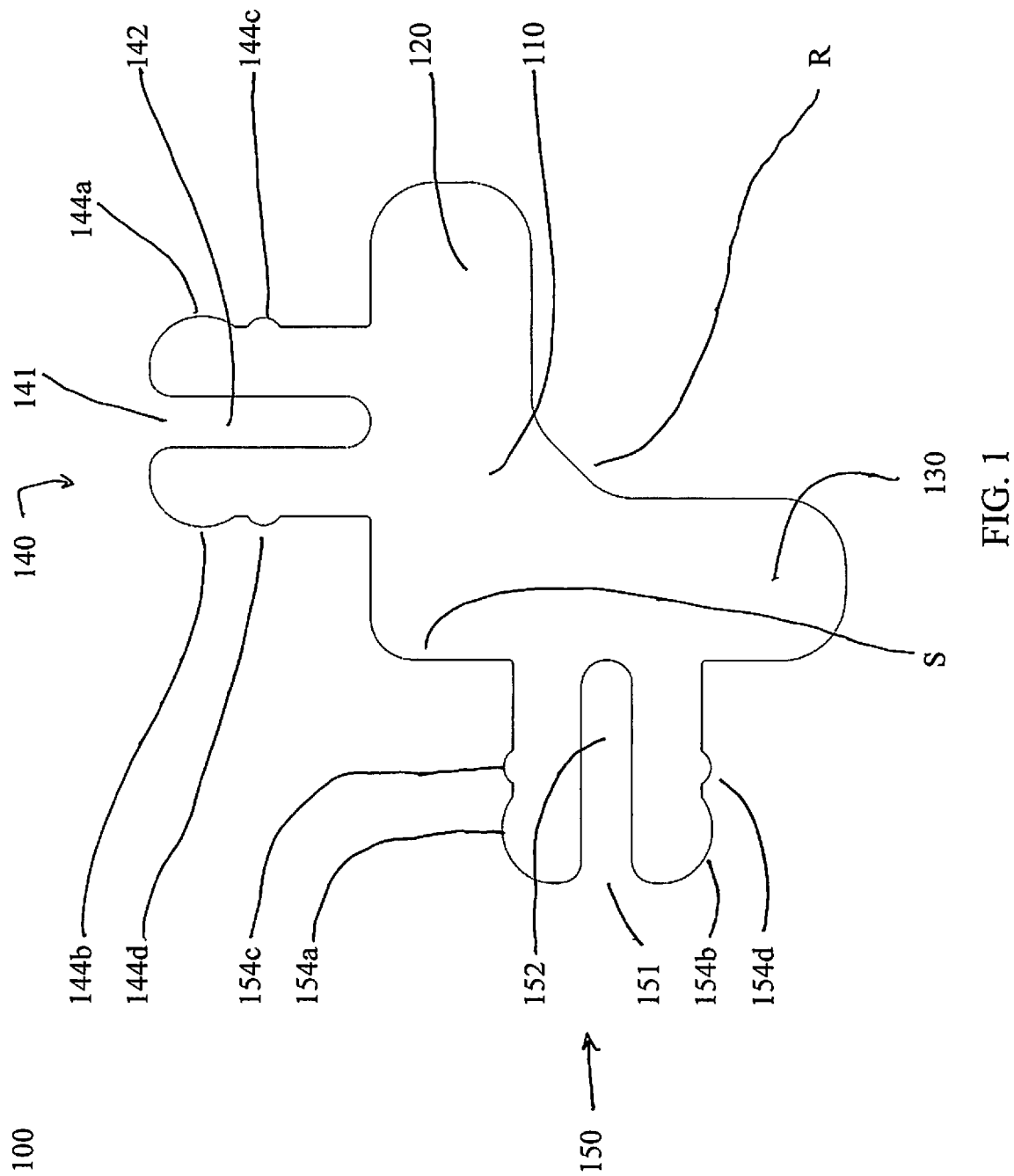
FIG. 1 illustrates an L-clip of the present disclosure.
Figure 6:
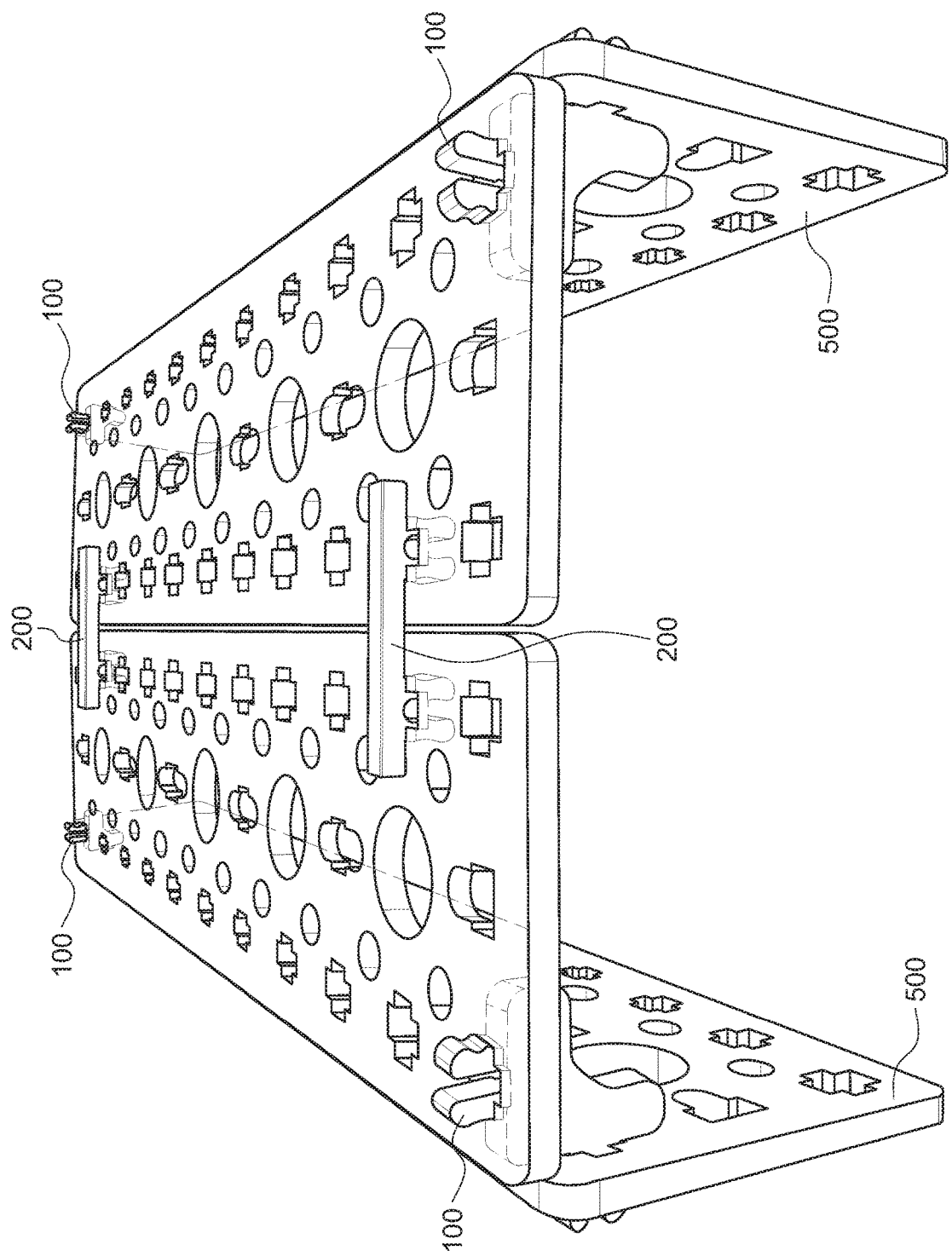
FIG. 6 is a perspective view of an assembled system of the present disclosure.
Figure 7:
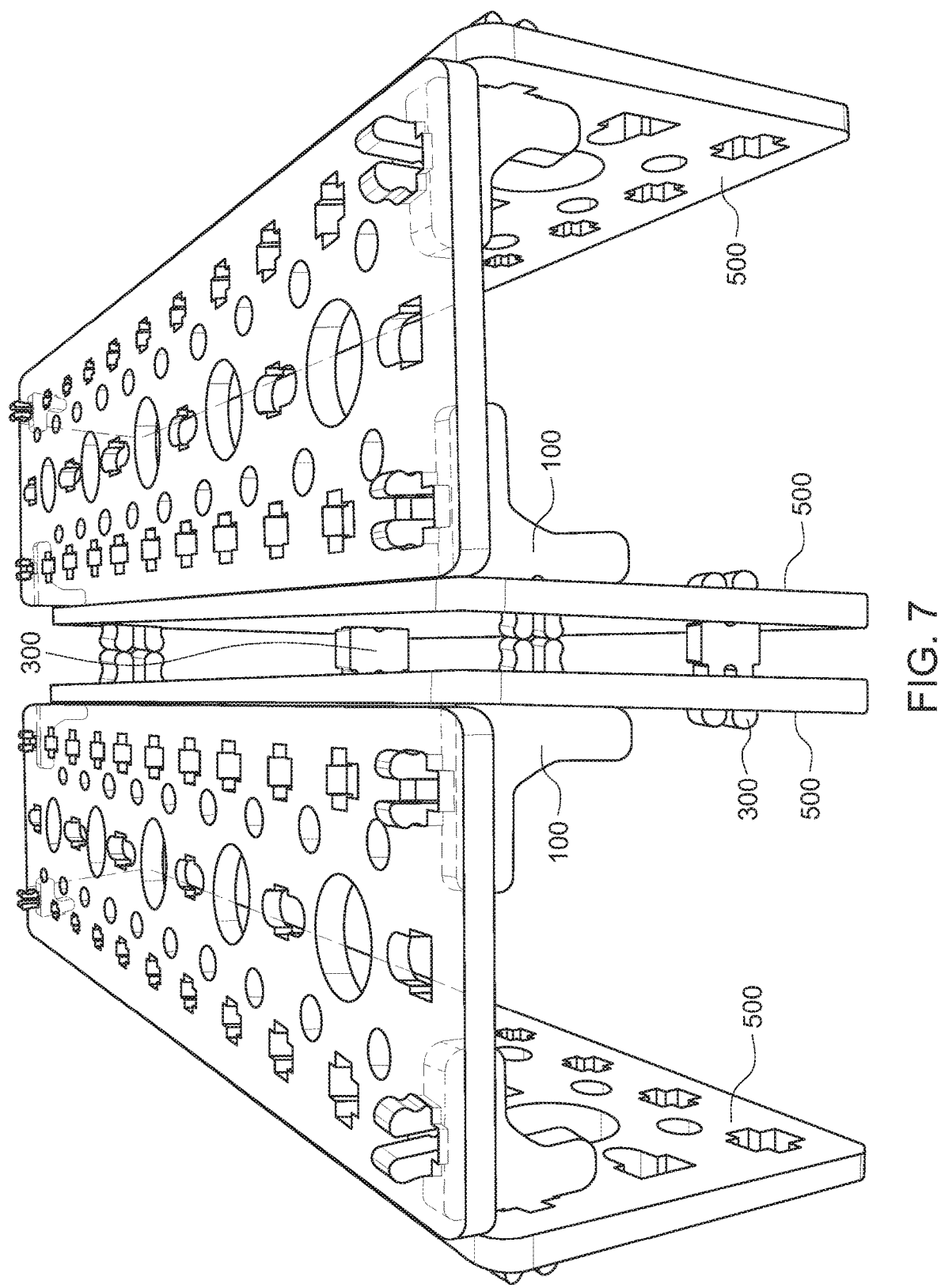
FIG. 7 is a perspective view of another assembled system of the present disclosure.
Figure 8:
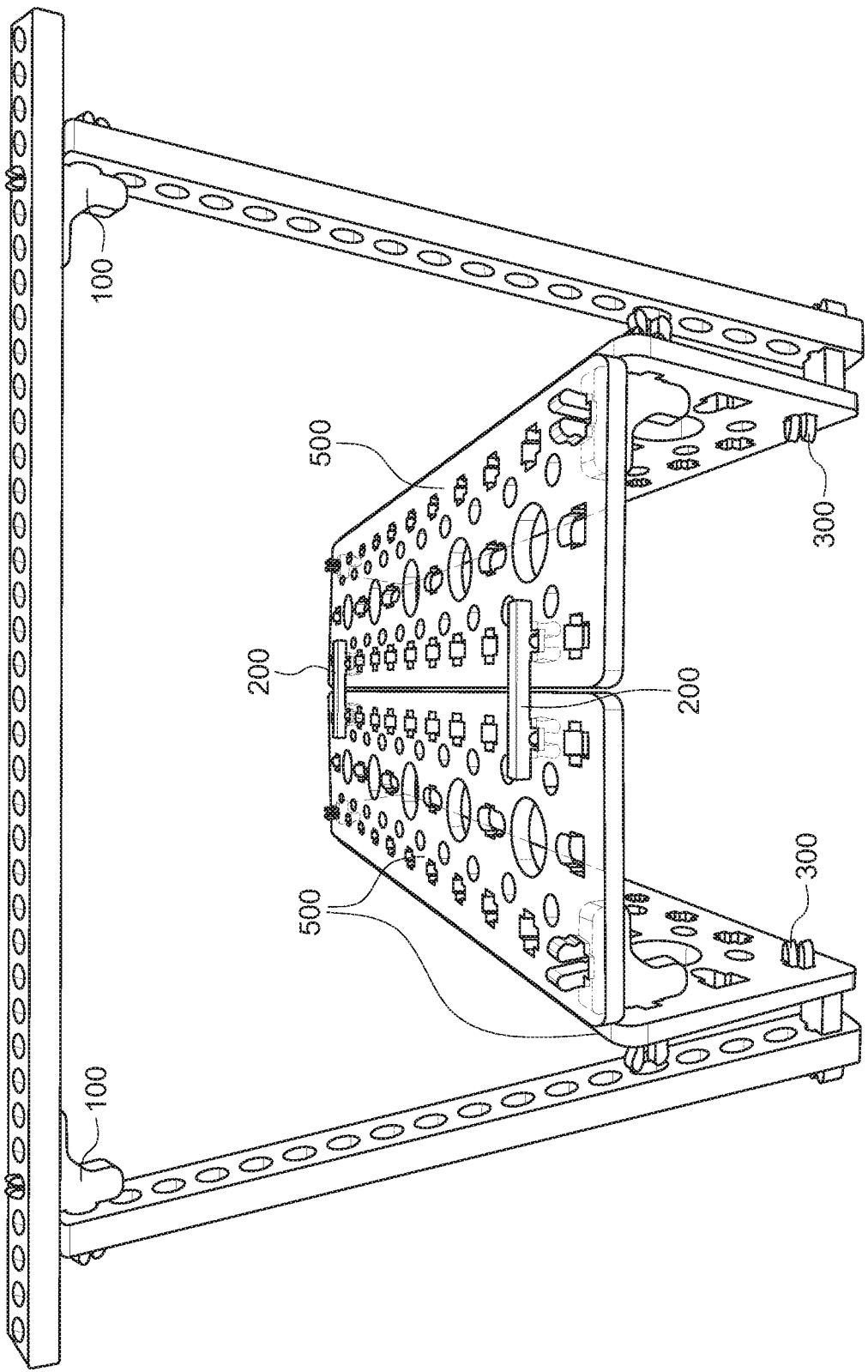
FIG. 8 shows the system of FIG. 7, with additional components added thereto.

FIG. 1 illustrates an L-clip of the present disclosure. The L-clip 100, as well as the other types of clips, includes a base 110, a first protrusion 120, a second protrusion 130, a first pair of fingers 140, and a second pair of fingers 150. The first pair of fingers 140 and the second pair of fingers 150 have a same length, from respective tips thereof to the base 110. A spacer S is provided to rest against a surface of a plate, when the clip 100 is releasably affixed thereto. (FIGS. 6-8.)

In the L-clip 100, the first protrusion 120 and the second protrusion 130 extend in opposite directions, away from the base 110. The first pair of fingers 140 and the second pair of fingers 150 extend away from the base 110 in respective directions 90 degrees apart from opposite respective directions of extension of the first protrusion 120 and the second protrusion 130.

The first protrusion 120, the second protrusion 130, the first pair of fingers 140 and the second pair of fingers 150 each extend from the base 110 along a same plane, in a two-dimensional manner. A predefined radius of curvature R is provided between the first protrusion 120 and the second protrusion 130. Curvature R of the predefined radius is configured for a user to press a finger against, to insert clip 100 into an opening of a plate.

The first pair of fingers 140 form a first opening 141 at a distal end thereof. A first gutter 142 extends from the first opening 141 to the base 110. The second pair of fingers 150 form a second opening 151 at a distal end thereof. A second gutter 152 extends from the second opening 151 to the base 110.

A first pair of first engagement protrusions 144a, 144c are provided on an outer side of one finger of the first pair of fingers and a second pair of first engagement protrusions 144b, 144d are provided in a corresponding position on an opposite outer side of another finger of the first pair of fingers. The first protrusion 120, the second protrusion 130, the first pair of fingers 140 and the second pair of fingers 150 extend from the base 110 of clip 100 along a same plane.

To facilitate insertion into an opening of a beam or a plate 500 (FIGS. 5-90), each finger of the first pair of fingers 140 flexes inward toward the first gutter 142. Each of the first pair of fingers 140 and the second pair of fingers 150 resiliently move toward the first gutter 142 and the second gutter 152, respectively, in response to a force pressing the first pair of fingers 140 toward the second pair of fingers 150. Upon insertion of engagement protrusions 144a, 144b through a through-hole opening of the beam or plate 500, locking friction is generated that secures the clip, with a resilient force of the first pair of fingers 140 and the second pair of fingers pressing away from the first gutter 142 and the second gutter 152, when the respective pair of fingers is in a flexed state. An audible click is output upon releasably securing the clip to the first plate or the second plate, with the click output when a first area between the first pair of first engagement protrusions 144a, 144c and a second area between the second pair of first engagement protrusions 144b, 144d strikes inner respective sides of the securing hole.

The L-clip is configured to join plates in perpendicular planes. Each clip of the system disclosed herein provides an axis of rotation for expedited assembly and disassembly of two or more plates. When first and second plates are joined using an L-clip, rotating the first plate relative to the second plate provides access to the distal ends of the one pair of fingers of the clip. Pushing the distal ends of the one pair of fingers towards the plate disengages the clip, providing a method of simple, affirmative disassembly that is not possible when the plates are joined by screws or other conventional fasteners.

Each clip of the system disclosed herein has a common finger design for plate connection, providing a modular design for rapid, and easy assembly, and multi-functionality.

The clips facilitate rapid disassembly by pushing on distal ends of the fingers, to extract the fingers from a respective opening in the plate.

The first protrusion 120, the second protrusion 130, the first pair of fingers 140 and the second pair of fingers 150 each extend from the base 110 along the same plane.

Figure 2:
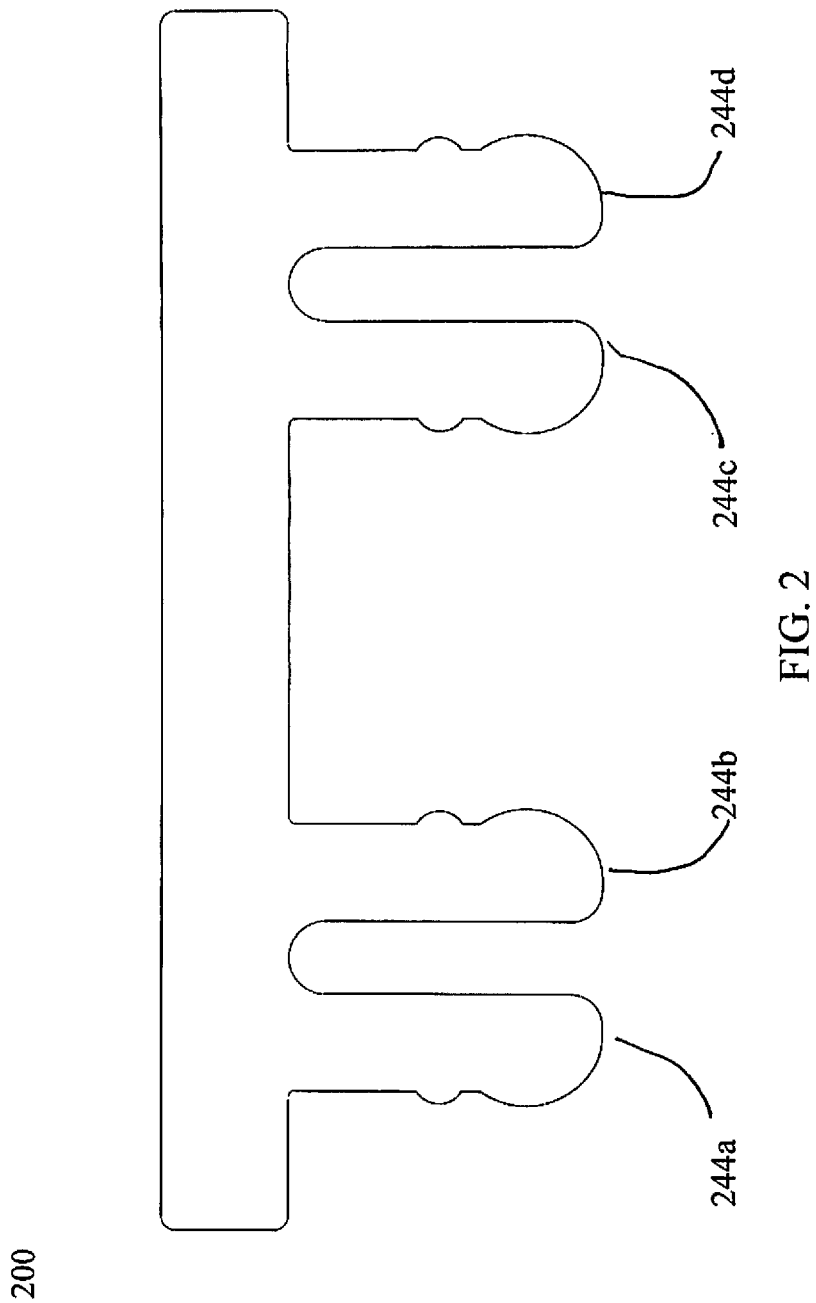
FIG. 2 illustrates a C-clip of the present disclosure.

FIG. 2 illustrates a C-clip 200 of the present disclosure. As shown in FIG. 2, a first pair of fingers 244a, 244b and a second pair of fingers 244c, 244d are provided on a common side, to facilitate attachment of plates and/or beams along a common plane, as illustrated in FIGS. 6 and 8.

Figure 3:
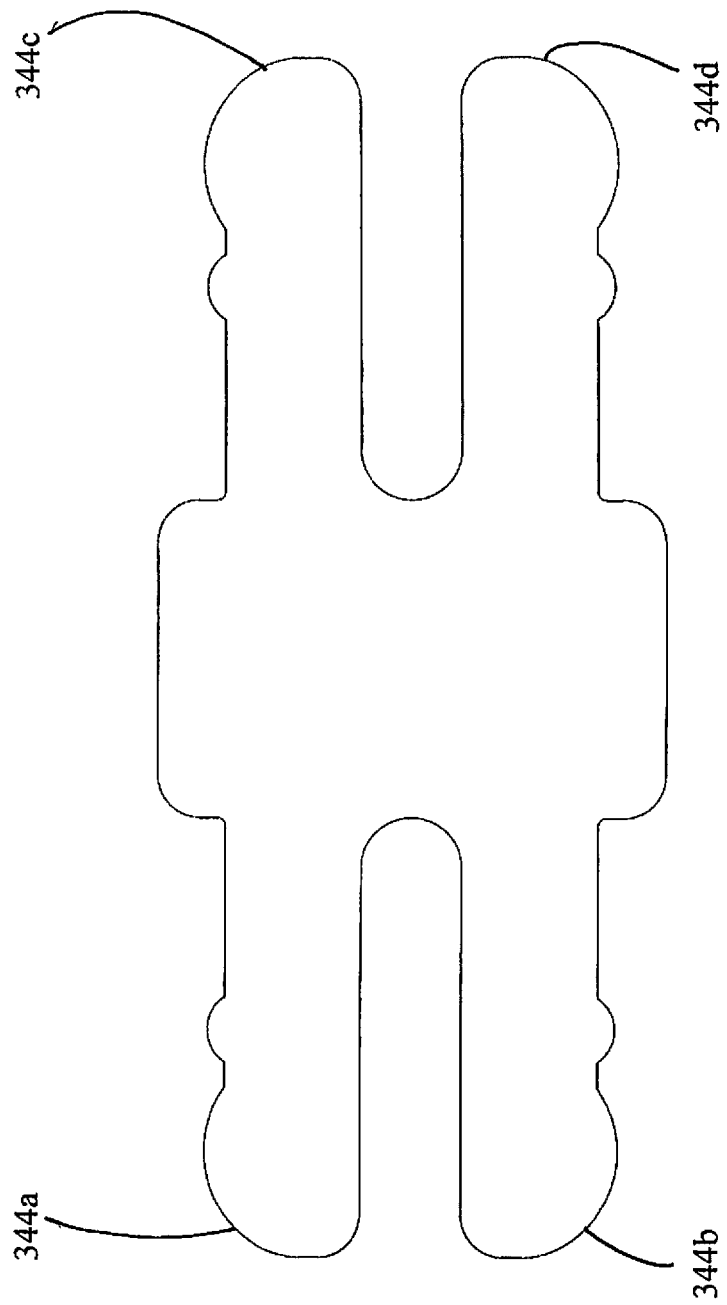
FIG. 3 illustrates an H-clip of the present disclosure.

FIG. 3 illustrates an H-clip 300 of the present disclosure. As shown in FIG. 3, a first pair of fingers 344a, 344b and a second pair of fingers 344c, 344d are provided on opposite sides, to facilitate attachment of plates along a parallel planes and/or beams, as illustrated in FIGS. 7 and 8.

Figure 4:
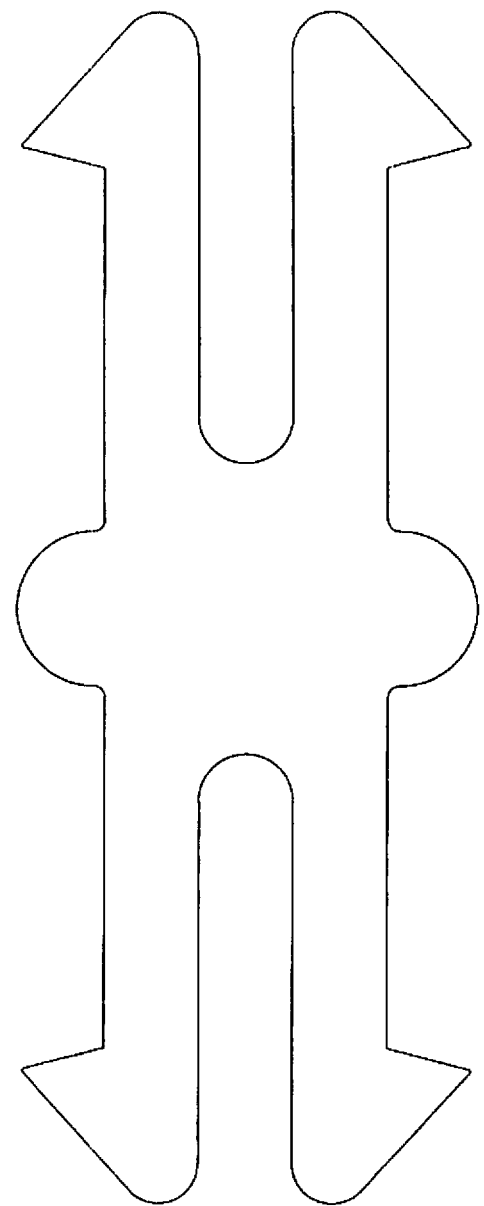
FIG. 4 illustrates an I-clip of the present disclosure.
Figure 9:
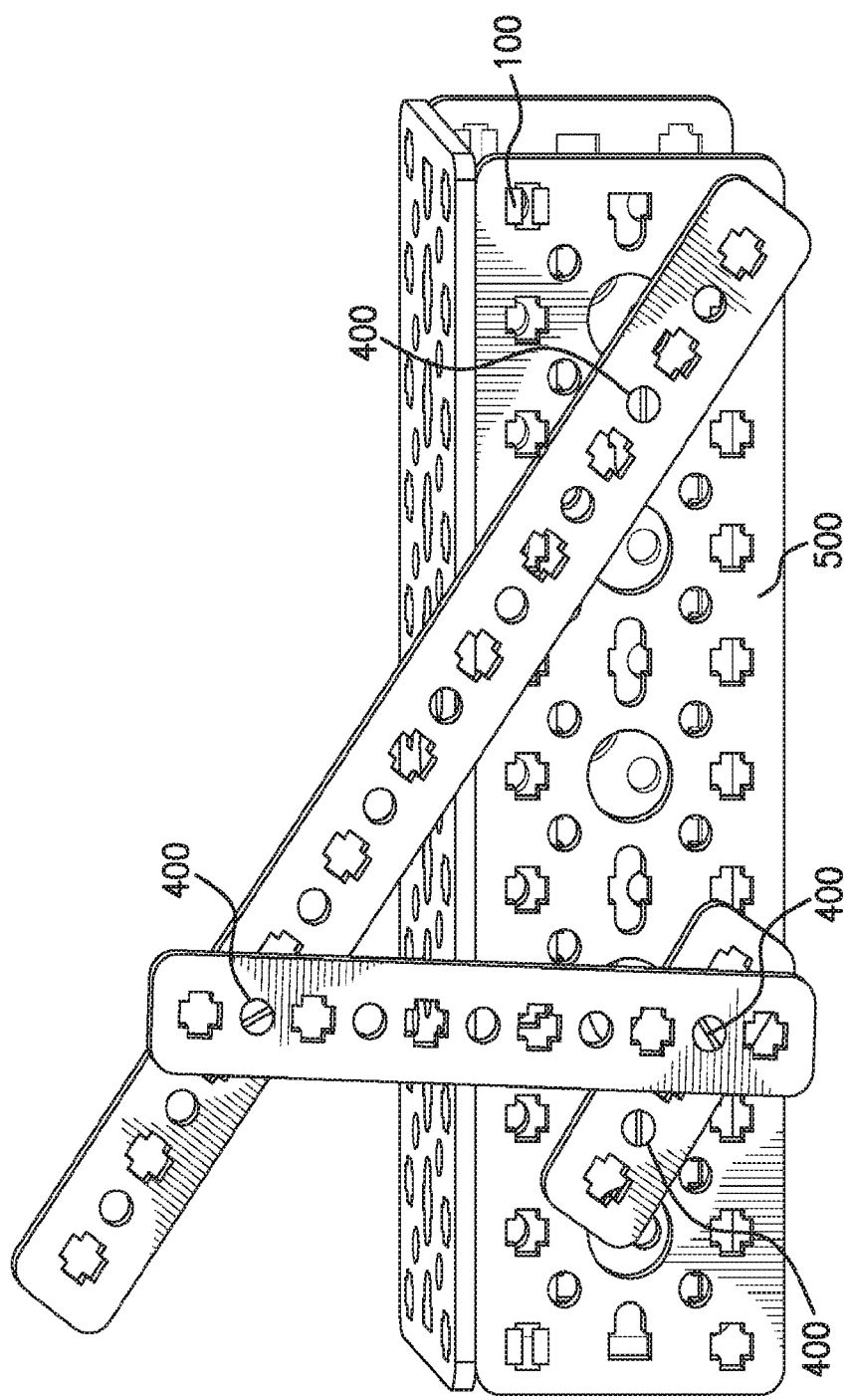
FIG. 9 is a side view illustrating rotation provided by the I-clip.

FIG. 4 illustrates an I-clip 400 of the present disclosure. The I-clip 400 provides rotatable connections in incident parallel planes, as illustrated in FIGS. 8 and 9.

Figure 5:
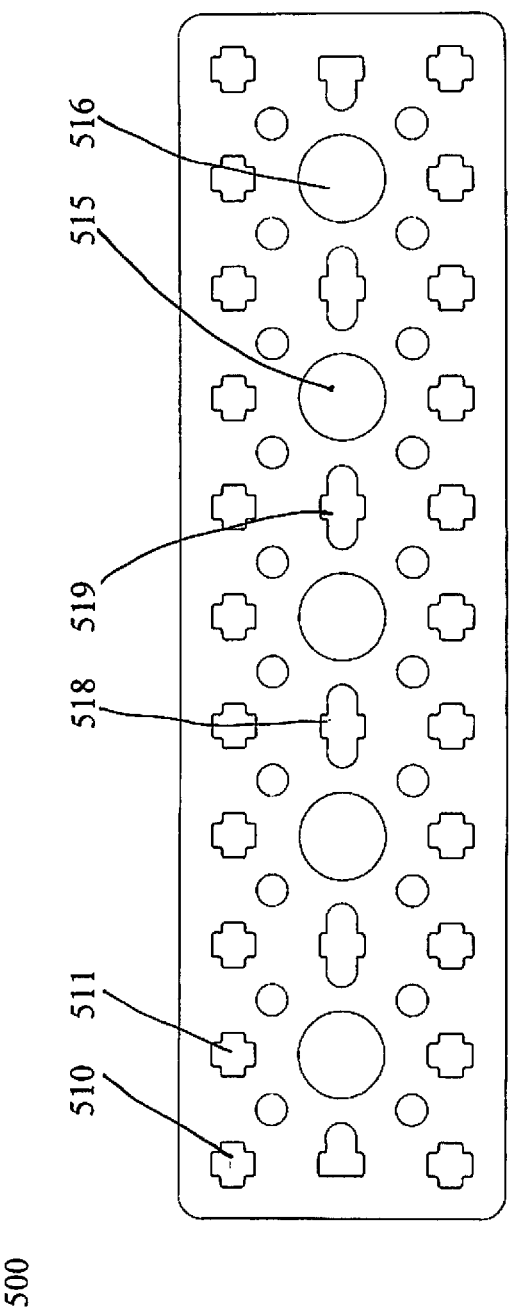
FIG. 5 illustrates a plate of the present disclosure.

FIG. 5 illustrates a plate 500 of a system of the present disclosure. The plate 500 includes a plurality of X shaped through-holes 510, 511, a plurality of O shaped through-holes 515, 516, and a plurality of rounded-I shaped through-holes 518, 519, for use in assembling a system of the present disclosure utilizing the clips of the disclosed system, including U-clips for connections in offset parallel planes and V-clips for connections in angular planes, in addition to the L-, H- and I-clips.

FIG. 6 is a perspective view of an assembled system of the present disclosure. FIG. 6 shows a three-dimensional (3D) structure formed of four plates 500 interconnected in perpendicular and parallel planes. The interconnection in the perpendicular planes is provided by L-clips 100, and adjacent plates oriented in a same plane are interconnected with C-clips.

FIG. 7 is a perspective view of another assembled system of the present disclosure. FIG. 7 shows a 3D structure with six plates interconnected in perpendicular and parallel planes. The interconnection in the perpendicular planes is provided by L-clips 100, and interconnection of plates 500 on a parallel plane is provided by H-clips 300.

FIG. 8 shows the system of FIG. 7, with additional components added thereto. In FIG. 8, two vertical beams and a horizontal beam are added, with the horizontal beam being non-rotatably attached to each vertical beam by L-clips 100, and each vertical beam rotatably attached at corresponding sides of the system.

FIG. 9 is a side view illustrating rotational movement provided by the I-clip. In FIG. 9, L-clips 100 secure plates 500. On one plate 500, a plurality of I-clips 400 are provided, which allow rotation of respective beams.

Figure 10:
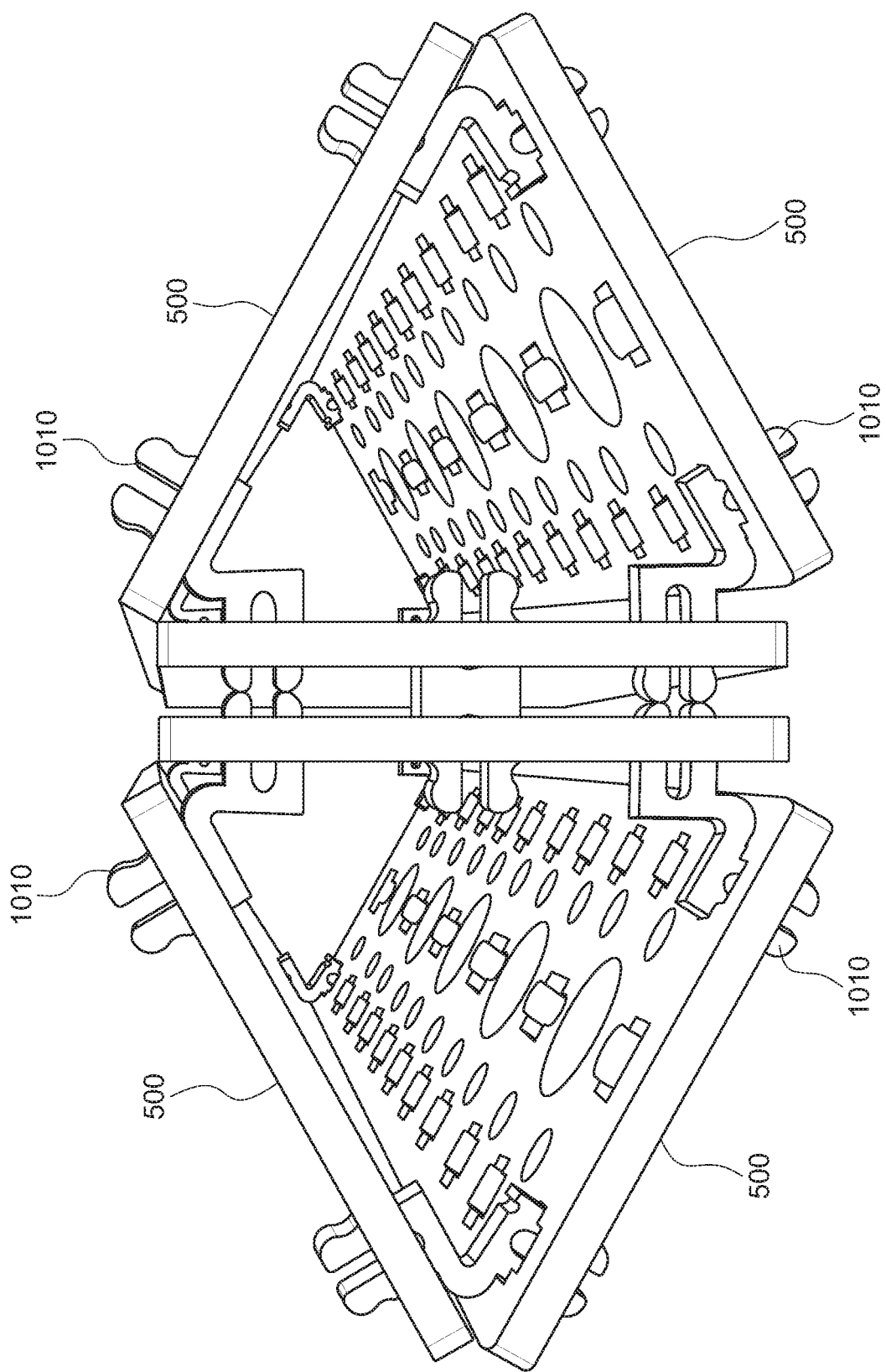
FIG. 10 is a front profile view of a plurality of V-clips of the present disclosure.

FIG. 10 is a front profile view of a plurality of V-clips 1010 attaching beams 500.

Provided are a set of compliant, multi-functional mounts for components to prototype various modular designs, including mounts for conventional sensors, actuators, servo motors, DC motors, and controllers, e.g., Arduino, Raspberry PI for utilization in the system. Accordingly, modular robots, machines and structural systems are provided in a kit comprising a set of planar clips that are low in cost to manufacture. The planar clips have identical geometry in every cross-section perpendicular to the plane of the clips making them amenable to fast and efficient laser-cutting or a similar manufacturing process. The L-, C-, U- and V-clips provide a static securing function, and the I-clips provide a hinge function.

Depths of fingers and base size of the clips can be varied for use with materials of varying thickness, to facilitate rapid, low-cost prototyping using plates and other materials of various thicknesses, with plate thickness readily modified to correspond to structural requirements of the various systems. The clips are compatible with materials of two nominal thicknesses, which engage with first and second engagement protrusions in each of the clips, thereby allowing joining a thinner plate with a thicker beam to provide additional strength compared to a thinner beam or vice-versa.

Also provided is a system of automated manufacture of plates of varying thicknesses, via laser cutting and without expensive die and mold creation and injection molding, to provide unique and customized through-hole dimension(s) and/or spacing(s) and geometry of plates and beams or other similar structures. The automated manufacture will also provide, via web-based computer interface, custom designed parts that engage with the aforementioned clips, plates, beams, and multi-functional mounts.

While the invention has been shown and described with reference to certain exemplary embodiments of the present disclosure thereof, it will be understood by those skilled in the art that various changes in from and details may be made therein without departing from the spirit and scope of the present invention as defined by the appended claims and equivalent thereof.

What is claimed is:

1. A planar clip comprising:
   a base;
   a first protrusion including a first flat surface extending from a proximal end thereof along a first plane to a distal end thereof;
   a second protrusion including a second flat surface extending from a proximal end thereof along a second plane to a distal end thereof;

a predefined radius;
a first pair of fingers; and
a second pair of fingers,
   wherein the first protrusion extends in a first direction substantially parallel to the first plane and away from the base wherein the second protrusion extends in a second direction substantially parallel to the second plane away from the base wherein the second direction is substantially perpendicular to the first direction,
   wherein each of the base, the first protrusion, the second protrusion, the first pair of fingers and the second pair of fingers are formed in a two-dimensional matter,
   wherein the predefined radius extends from the proximal end of the first protrusion to the proximal end of the second protrusion, and
   wherein the first plane is substantially perpendicular to the second plane.

2. The planar clip of claim 1, wherein the first protrusion and the first pair of fingers are substantially perpendicular to the second protrusion and the second pair of fingers.

3. The planar clip of claim 1, wherein the first pair of fingers and the second pair of fingers extend from the base in a direction substantially opposite from respective directions of extension of the first protrusion and the second protrusion.

4. A system utilizing the planar clip of claim 1 to releasably attach the first plate to the second plate.

5. The system of claim 4, wherein the predefined radius is configured to accommodate a finger of a user to press to attach the planar clip to at least one of a first plate and a second plate, and the first plate is releasably attached along a plane that is substantially perpendicular to a plane formed by the second plate.

6. A planar clip comprising:
a base;
a first protrusion including a first flat surface extending from a proximal end thereof along a first plane to a distal end thereof;
a second protrusion including a second flat surface extending from a proximal end thereof along a second plane to a distal end thereof;
a predefined radius;
a first pair of fingers; and
a second pair of fingers,
   wherein the first protrusion extends in a first direction substantially parallel to the first plane and away from the base wherein the second protrusion extends in a second direction substantially parallel to the second plane away from the base wherein the second direction is substantially perpendicular to the first direction,
   wherein each of the base, the first protrusion, the second protrusion, the first pair of fingers and the second pair of fingers are formed in a two-dimensional matter,
   wherein the first pair of fingers comprises a first opening at a distal end thereof, extending to the base, forming a first gutter,
   wherein the predefined radius extends from the proximal end of the first protrusion to the proximal end of the second protrusion, and
   wherein the first plane is substantially perpendicular to the second plane.

7. The planar clip of claim 6, wherein the second pair of fingers comprises a second opening at a distal end thereof, extending to the base, forming a second gutter.

8. The planar clip of claim 6, wherein the first pair of fingers and the second pair of fingers are configured to resiliently move toward the first gutter and the second gutter, respectively, in response to a force pressing the first pair of fingers toward the second pair of fingers.

9. The planar clip of claim 6, wherein each of the first protrusion, the second protrusion, the first pair of fingers and the second pair of fingers extend in different respective directions.

10. The planar clip of claim 9, wherein each different direction is at least 90 degrees apart from each other direction.

11. The planar clip of claim 6, further comprising a first pair of first engagement protrusions and a second pair of first engagement protrusions formed on respective outer sides of each finger of the first pair of fingers.

12. The planar clip of claim 11, further comprising a first pair of second engagement protrusions and a second pair of second engagement protrusions formed on respective outer sides of each finger of the second pair of fingers.

13. The planar clip of claim 11, wherein each finger of the first pair of fingers is configured to flex inward toward the first gutter upon insertion of the planar clip into a hole having an opening larger than the first gutter and smaller than a distance between outer edges of distal protrusions of the first pair of first engagement protrusions and the second pair of engagement protrusions.

14. A system utilizing the planar clip of claim 6 to releasably attach the first plate to the second plate.

15. The system of claim 14, wherein each finger of the first pair of fingers flexes toward the first gutter to reduce a size of the first opening when the first pair of fingers is inserted into a securing hole of one of the first plate and the second plate.

16. The system of claim 15, wherein a click is output upon securing the first plate to the second plate.

17. The system of claim 16, wherein the click is formed by a first area between the first pair of first engagement protrusions and a second area between the second pair of first engagement protrusions striking inner respective sides of the securing hole.

18. The system of claim 14, wherein the system is assembled without adhesives, welding, screws, nuts or bolts.

* * * * *